United States Patent [19]

Schäfer et al.

[11] 4,427,703

[45] Jan. 24, 1984

[54] CONFECTIONERY ARTICLES, AND APPARATUS AND PROCESSES FOR PRODUCING THEM

[75] Inventors: Georg Schäfer, Heppenheim, Fed. Rep. of Germany; Eberhard Schulz, Perchtoldsdorf, Austria; Otto Schulz, Lautertal, Fed. Rep. of Germany

[73] Assignee: Thomas J. Lipton, Inc., Englewood Cliffs, N.J.

[21] Appl. No.: 308,880

[22] Filed: Oct. 5, 1981

[30] Foreign Application Priority Data

Oct. 3, 1980 [GB] United Kingdom ................ 8032037

[51] Int. Cl.³ .................... A23G 3/00; A23G 9/00; A23G 9/24
[52] U.S. Cl. .................... 426/101; 426/284; 426/306; 426/307; 426/499; 426/660; 426/514; 426/524
[58] Field of Search ............. 426/284, 306, 283, 307, 426/101, 94, 104, 92, 514, 496, 524, 499; 99/450.6, 450.7, 450.8, 353; 264/142, 209, 150, 234, 236, 323; 425/324.1, 449, 404, 457, 447, 526

[56] References Cited

U.S. PATENT DOCUMENTS

| | | |
|---|---|---|
| 2,004,009 | 6/1935 | Moir . |
| 2,042,940 | 6/1936 | Herron ............................. 426/284 |
| 2,056,122 | 9/1936 | Collinson ......................... 426/284 |
| 2,960,045 | 11/1960 | Pentzlin .......................... 264/150 |
| 2,976,155 | 3/1961 | Heller ............................. 264/209 |
| 3,327,651 | 6/1967 | Nielsen . |
| 3,894,159 | 7/1975 | Franta ............................. 426/284 |
| 4,162,333 | 7/1979 | Nelson ............................ 99/450.7 |
| 4,283,430 | 8/1981 | Dosler et al. .................... 426/94 |

FOREIGN PATENT DOCUMENTS

| | | |
|---|---|---|
| 475151 | 4/1929 | Fed. Rep. of Germany . |
| 727639 | 6/1932 | France . |
| 775375 | 12/1934 | France . |
| 1038750 | 10/1953 | France . |
| 1381802 | 11/1964 | France . |
| 223362 | 10/1924 | United Kingdom . |
| 241552 | 6/1926 | United Kingdom . |
| 291278 | 5/1928 | United Kingdom . |
| 1379407 | 1/1975 | United Kingdom . |
| 1498155 | 1/1978 | United Kingdom . |

Primary Examiner—Jeanette M. Hunter
Attorney, Agent, or Firm—Brumbaugh, Graves, Donohue & Raymond

[57] ABSTRACT

A composite ice confection product comprises an open-ended wafer with an internal fat-based coating and filled with the ice confection, a continuous fat-based capping covers the open-end(s) of the wafer. In a preferred process for preparing the product the capping is formed, for example by applying it below its slip-melting point and in fluid condition, in such a way that it forms with the internal coating a substantially expermeable envelope around the ice confection. A suitable apparatus is described in which the fat-based confection for the capping can be maintained fluid by shear and optionally also by overpressure.

31 Claims, 6 Drawing Figures

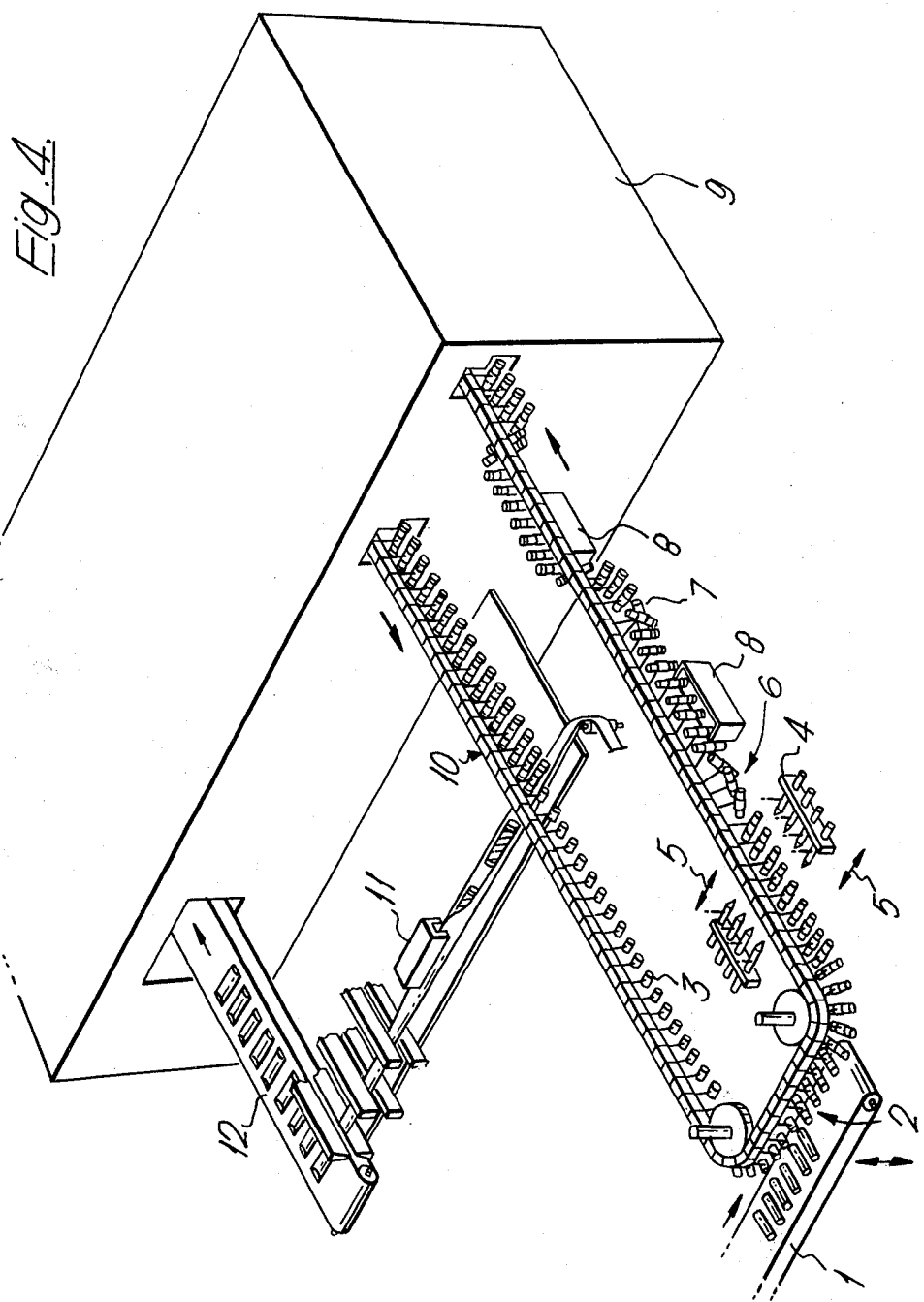

CONFECTIONERY ARTICLES, AND APPARATUS AND PROCESSES FOR PRODUCING THEM

This invention relates to apparatus and processes for producing confectionery articles, in particular frozen confectionery articles. The invention also relates to certain forms of frozen confectionery articles themselves.

It is a widely-used industrial technique to line edible wafer containers, such as cones, with chocolate or chocolate-like fat-based confectionery coatings, and then to fill them with ice cream or the like. Many such products are manufactured industrially, then distributed and sold as filled ice cream cones, some topped with various decorations including chocolate fragments. Tubular wafer containers are also known, and it has been suggested to provide them with an ice cream filling. Nevertheless arrangements for doing this effectively on an industrial scale are not available, and on an experimental scale it is also found that such products are difficult to keep.

It is the aim of this invention to provide an arrangement and product form which gives good stability and convenient handling when applied to wafer containers filled with ice cream, and also to provide processes and apparatus applicable to the preparation of such product forms on an industrial scale.

According to this invention there is provided a composite ice confection product comprising an open-ended wafer container lined with an internal fat-based confection lining and containing an ice confection filling, characterised by a continuous capping of fat-based confection which covers the open end of the wafer container and preferably overlaps the adjacent portion of the outside surface of the wafer container and which is also continuous with the internal fat-based confection lining.

Usually, the continuous capping of fat-based confection is a separate application of fat-based material from that which lines the wafer container, congealed with the internal fat-based confection lining for continuity, and arranged so that the continuous capping of fat-based confection, together with the internal fat-based confection lining, forms a substantially continuous impermeable envelope about the ice confection filling.

This can conveniently be achieved when the continuous capping of fat-based confection has been applied as a flowable rapid-setting coating maintained in a condition of fluidity below its slip melting-point by shear and optionally overpressure.

We find that products of this form are of particular suitability for mechanical stability in manufacture, storage and distribution, and offer a pleasant easy-to-handle product for the consumer.

The invention also provides corresponding manufacturing processes, for example as described below, and corresponding apparatus.

For example, the invention provides a process for the production of composite confection products comprising confectionery containers each having two oppositely and outwardly directed openings, filled with extrudable confection material, characterised by transporting a succession of the confectionery containers to a filling station comprising a pair of oppositely and inwardly directed extrusion nozzles, holding the confectionery containers to be filled in predetermined alignment with the corresponding extrusion nozzles, moving the extrusion nozzles into the opposite container openings, filling the containers with the confection material by extrusion through the nozzles, removing the extrusion nozzles from the container openings, and transporting the filled confectionery containers away from the filling station; and corresponding apparatus.

Also provided is a process for preparing a composite ice confection product, comprising the steps of:
(a) providing an open-ended wafer container with an internal lining of fat-based confection material, and
(b) introducing into the lined wafer container a filling of ice confection,
characterised by the further steps of:
(c) providing a continuous capping of fat-based confection material to cover the open end of the wafer container and preferably to overlap the adjacent portion of the outside surface of the wafer container, and
(d) causing the capping to solidify in continuity with the internal fat-based confection lining; and corresponding apparatus.

This can be achieved for example by transporting a succession of the filled confectionery containers to a capping station, applying a continuous capping of fat-based confection material to cover the open end of the wafer container, and transporting the filled wafer containers away from the capping station.

Thus, apparatus according to one form of the invention comprises a conveyor for conveying a series of hollow edible confectionery containers, each with a pair of openings at opposite ends, stepwise successively to filling and capping stations; a filling station or stations arranged to fill extrudable confection material into each of the opposite openings of each container, and a capping station or stations arranged to close each opening thus filled with an edible capping material.

In certain useful embodiments the hollow edible confectionery containers can be tubular with open ends. They can for example be of baked wafer material. Tubes made of a spiral winding of wafer material are suitable, for example. The extrudable confection can comprise ice cream, optionally containing various additives. In such a case it is preferred to have the hollow edible confectionery articles, when of dry edible material such as wafer, coated internally with water-resisting edible material, e.g. fat-based couverture. This coating can be applied either in separate wafer manufacture or at a preliminary internal coating station of the present apparatus.

When the hollow confectionery containers are of tubular form, (which can have either circular or non-circular section, e.g. oval section), the conveyor can have a series of transverse semi-cylindrical pockets in which the containers sit and are transported. Their opposite open ends then open outwardly on each side of the conveyor.

A filling station can be arranged so that at any filling step the two opposite open ends of one container are filled simultaneously. The apparatus can be arranged for clamping and subsequent release of the container being filled, e.g. with a clamping arm to clamp the container in position on the conveyor. The conveyor can be arranged for precise location of the container being filled in relation to the filling station, e.g. by having one or more formations such as a groove or rib interengageable with one or more fixed complementary formations, e.g. rib, flange or groove, in the vicinity of the filling station.

The filling station can comprise a pair of opposite nozzles connected to a supply of extrudable confection and arranged to be pushed towards each other into the opposite container openings.

The flow of extrudable confection and movement of the nozzles is preferably subject to coordinated control, in which the nozzles are quickly pushed deep into the opposite container openings and slowly withdrawn. Preferably the confection stream is switched on at or shortly before the inward thrust of the nozzles is complete. When the filling operation is complete, the confection stream can be switched off. Preferably at or about this point the outward motion of the nozzle is briefly stopped, and then resumed to give rapid further and complete withdrawal. In this way, the formation of a clean flat or shallow pyramidal surface to the filled material can be promoted, and the formation of strings or bridges of extrudable confection avoided. Clean filling can also be promoted by arranging for the flow control valve to give slight forward initial thrust of extrudable confection on switch-on, and/or slight backward suck on switch-off. The flow control valves can be adjusted to control the rate and quantity of filling.

A plurality of such filling stations can be provided so that a number of confection containers are filled in tandem. For example four pairs of opposite nozzles can be provided to fill four containers at each filling operation. The materials filled by each nozzle of an opposite pair can be the same or different: e.g. ice cream of different flavours/colours.

The capping stations can comprise means for applying capping material to close simultaneously each of the two filled openings of a filled container. The capping material can preferably be a fat-based couverture that hardens, preferably rapidly, on application.

Especially when the filled container is of tubular form, the capping stations can comprise a first and a second pair of nozzles, e.g. of slotted form. The first pair can be arranged to dose capping material on to and adjacent the ends of the confection tubes, e.g. in a downwardly dropping direction, so as to coat and close an upper portion, preferably about one half, of the opening and tube end. An arrangement can then be provided to invert the half-capped confection article, e.g. by rotating it about its axis by 180°, and present the half-capped confection to the second pair of nozzles, where a further dose of capping material can be applied, e.g. in a similar way, to complete the capping of the ends of the articles. Preferably fat-based couverture, when applied in this way, forms a coherent end-capping which extends a short distance along the outside of the tubular confection articles. If desired the rotation can be performed without longitudinal transport of the confection article, so that the same pair of dosing nozzles applies both the first and the second half of the capping for each tube end. Alternative dosing nozzles can be round in section insted of slotted form.

The filled capped articles can preferably be carried through a hardening zone maintained at a suitable temperature for stabilising the product, before or after a wrapping stage.

According to the invention a confectionery article, (which the above described apparatus and method can be used to prepare), comprises a tubular dry edible (e.g. wafer) container having an internal water-impermeable layer (e.g. fat-based couverture), a filling of ice confection and two end-cappings, e.g. water-impermeable material preferably fat-based as the internal layer, and preferably substantially continuous therewith to form an impermeable envelope about the ice confection. Preferably the end cappings each also extend a short distance along the outside of the tubular container.

According to an advantageous feature of this invention, fat-based couverture is applied to the composite ice confection product to be coated at a lower temperature than its slip melting point and in a condition of fluidity maintained by overpressure and shear, so that on discharge from a dosing nozzle on to the product it solidifies rapidly. For example such a couverture can be applied at for example about 19°-21° and sometimes up to about 25° while its melting point is up to about 30° C., but preferably 25° C. or less.

Such a couverture can be conditioned and supplied to a dosing nozzle under pressure from apparatus according to the invention in which the couverture is heated above its melting point in a first vessel, and cooled in a second vessel under pressure and agitation to a temperature at or close to the desired temperature of application. The cooled agitated mixture is led rapidly under pressure and at high shear rate to a discharge nozzle.

This arrangement can advantageously be used for end-capping the tubular filled containers mentioned above. Below the couverture dosing nozzles there can be provided a heated recycling drain to catch and return excess dosed couverture to the conditioning apparatus (e.g. to the heated vessel of molten couverture).

Preferred embodiments of the different aspects of this invention are described below for illustration by reference to the accompanying drawings.

FIG. 1a shows a diagrammatic axial cross-section of product corresponding to that shown in FIG. 1.

FIG. 2a shows one possible form of filling valve for use in the apparatus of FIG. 2.

FIG. 4 shows a fragmentary diagrammatic part-exploded schema of a second, alternative apparatus for producing articles as shown in FIG. 1, another embodiment of the invention and usable in processes according to the invention.

Figure 1:
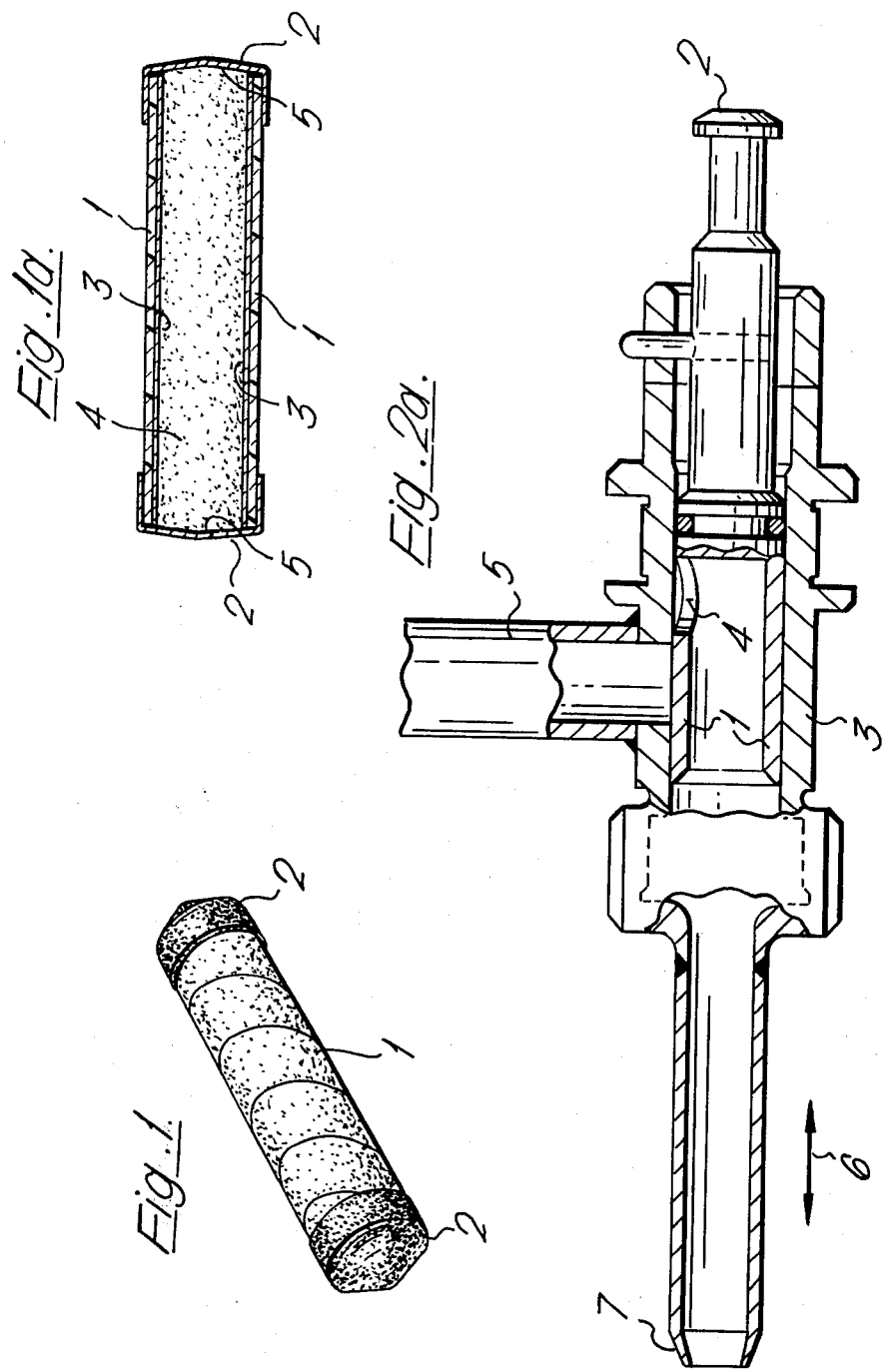
FIG. 1 shows a perspective diagram of a confectionery product, an embodiment of one aspect of the invention.

FIGS. 1 and 1a show in diagrammatic perspective and section an edible confection product having a tubular (dry) crisp bakery outer wafer (1), filled with ice cream (4) separated from wafer (1) by an internal layer of fatty-based coating (3), and capped by two fatty-based end coatings (2). The wafer in this case comprises a product showing traces of its manufacturing method, spiral winding of a bakery strip, though other types of wafer with two opposite openings are usable.

FIGS. 1 and 1a also show that each capping (2) covers the open end of the wafer tube (1) with its ice cream filling (4) showing a substantially flat or shallow pyramidal surface (5) at the open-end of the wafer tube (1), and the capping (2) also overlaps the portion of the outer surface of wafer tube (1) adjacent to its open end to give a good seal and stability.

Figure 2:
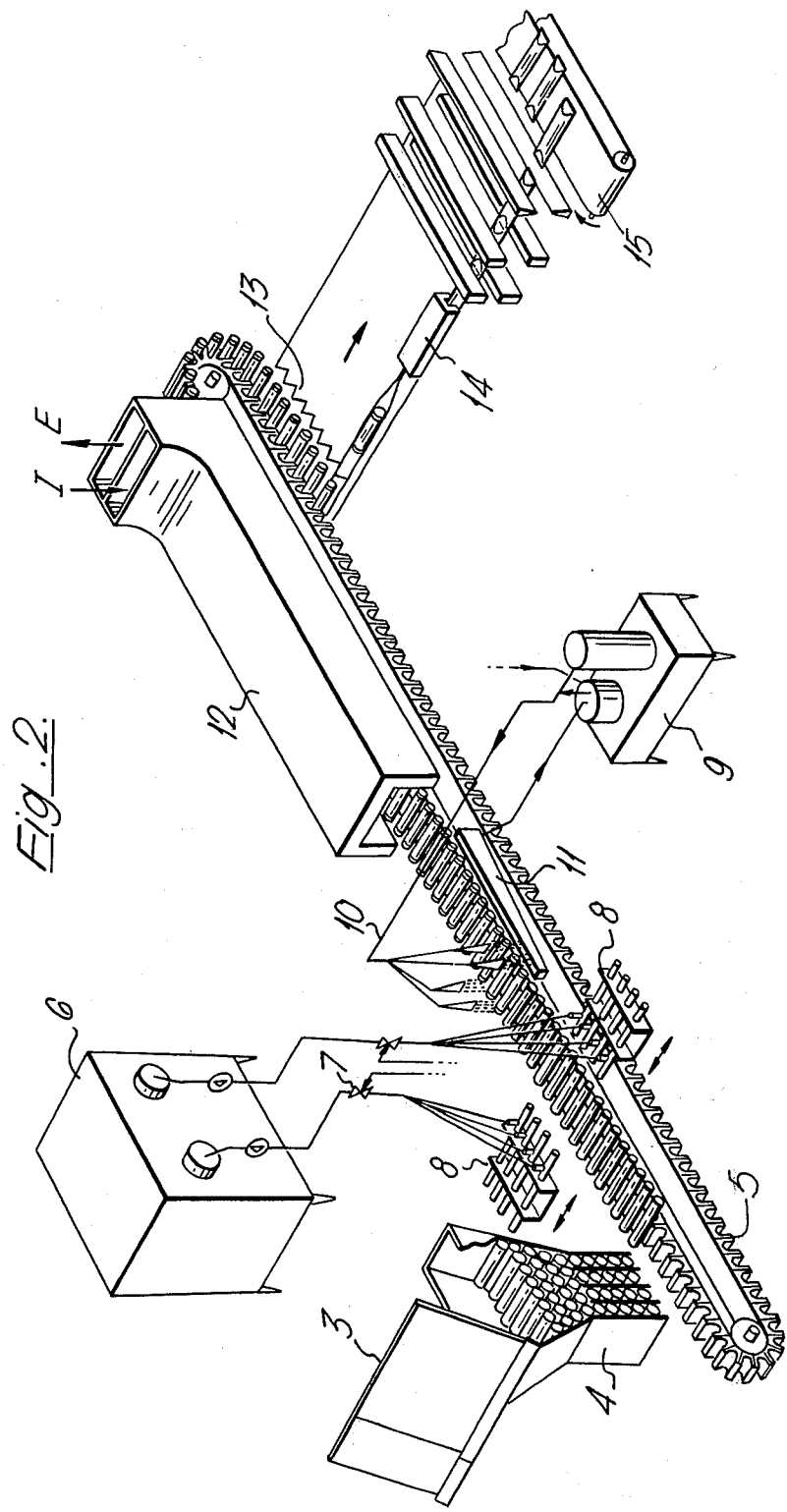
FIG. 2 shows a fragmentary, diagrammatic, part-exploded schema of apparatus for producing articles as shown in FIG. 1, an embodiment of another aspect of the invention, and usable in processes according to the invention.

FIG. 2 shows apparatus for preparing products as shown in FIG. 1. The starting materials fed to the apparatus are empty tubular wafers internally coated with fatty material; ice cream; and fatty coating material for the end cappings; though in other embodiments different starting stages may be chosen.

The principal components of the apparatus shown in FIG. 2 are: a chute 3 for feeding tubular wafers into the system from transport carton shown; a feed hopper or magazine 4 for tubular wafers; a conveyor 5 for tubular wafers, comprising a chain-link belt with each holding unit recessed to receive and positively locate a tubular wafer, and provided with drive and control to advance in a step-by-step manner positively locating the holding units at functional stations; an ice-cream freezer 6 in this case delivering a pair of ice cream streams, similar or different in composition, through a pair of lines having optional control points and arrangements for introducing additives at 7; a pair of arrays 8 of filling stations, arranged here to fill four tubes with ice cream at each end at each operation step; a conditioning unit 9 for end-capping material, here chocolate-type couverture; an array 10 of end-capping nozzles (only a few shown in the drawing, arrangement for ensuring rotation of the filled wafers between deposits of successive half end-caps also not shown); a drain 11 for recycling excess capping material; a hardening tunnel (here $-16°$ C.) with heat-exchange circulation pattern of inlet air (I) and exhaust air (E); a transfer arrangement 13 using release flaps for transferring filled, capped, cooled product from conveyor 5 to an 8-lane heat-sealing packaging machine of conventional kind shown diagrammatically at 14; and finally a conveyor for transport of packaged product 15 to cold store.

The details of mechanical arrangement of each of the above-described components can be chosen widely at will. For example the filling nozzles of which eight make up the array 8 can be slidable filling tubes fed by controlling peristaltic pumps on flexible lines, directly coupled to the filling tubes, and finely adjusted by clamping arrangements, with flexible resilient tubes that allow "breathing" and matching of continuous ice cream flow out of freezer 6 to discontinuous filling action at the nozzles. An alternative arrangement, preferable when the ice cream stream or streams contain particulate material, e.g. crushed nuts, uses piston-slider filling valves as shown in supplementary FIG. 2a. Preferably the rate of withdrawal of the filling nozzles during the filling operation is matched to the ice cream extrusion rate.

Alternative arrangements for completing the filling operation and providing a clean flat or shallow pyramidal surface to the filled tubular containers can comprise for example air-blower arrangements or cutting arrangements to remove any excess filling. It is preferable to avoid underfilling.

Alternative arrangements for the capping operation can include carrying out a single capping dosage of the fat-based coating for each tube end to be capped, for example with a heated wiper or spatula just below each tube end to be capped to make the bottom of the coating even, and to avoid excessive drip formation.

As shown in FIG. 2a a hollow piston 1 mechanically controlled by end 2 slides in a valve cylinder 3. The valve is opened when aperture 4 slides from the closed position shown to a position opposite inlet flow tube 5. The whole assembly is slidable in the directions of arrows 6 so that under appropriate control nozzle delivery end 7 enters and leaves the hollow wafers to be filled. The control mechanism for the valve provides timings so as to fill the wafers in the manner described above.

Figure 3:
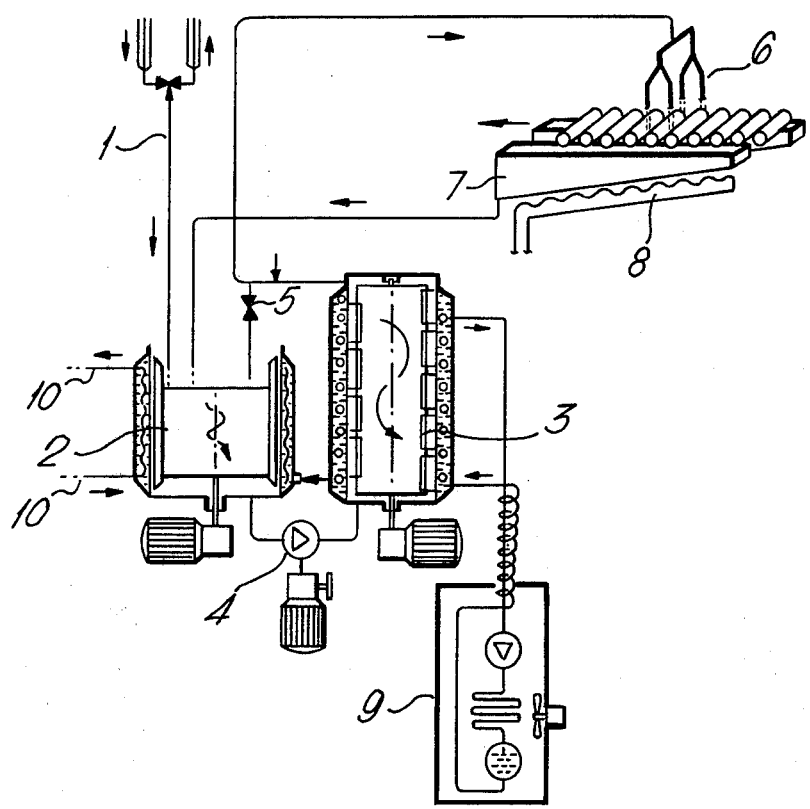
FIG. 3 shows a corresponding schema and flow chart of apparatus for conditioning and delivering rapidly-hardenable confection coating material, an embodiment of another aspect of the invention, usable in processes according to the invention, and also (in this embodiment) forming a part of the apparatus of FIG. 2.

FIG. 3 shows an embodiment of conditioning apparatus which can be used to prepare chocolate-type or other fatty coating material or couverture for application to confectionery articles. The arrangement of FIG. 3 can but need not only be applied as part of the arrangement of FIG. 2. It can also be used to prepare and/or apply coatings in many other situations, especially when rapid hardening of the coating material is required.

The arrangement of FIG. 3 includes a supply line 1 for the coating mix. This mix can for example comprise about 65% total fat, about 25.5% sugar, (water e.g. below about 1%), and have viscosity about 200 cp at 40° C. and fatty-melting-point e.g. about 25° C.–27° C. (slip melting point). Many alternative recipes are usable under appropriate conditions: here the intended application temperature and solidification temperature is about 19° C.–21° C. The mix can be supplied to the conditioning arrangement at about 25° C.–35° C., initially into scrape-stirred temperature-controlled container 2, and pumped into a closed cooling container 3, also scrape-stirred and temperature-controlled, by a continuously-variable controllable pump 4. The temperature in container 3 can be about 20° C.–22° C. for example, e.g. about 19°–21°, and the contents can be under up to about 2–5 bar over-pressure for example. The arrangement has an outlet line and recycle (pressure-dropping) valve 5, the outlet line leading in this embodiment to the couverture-applying stations of the main confection-production apparatus, and in particular the array 6 of enrobing nozzles. These can take the form of e.g. 20 mm × 1 mm slits, arranged parallel to and above the axis of the tubes to be end-capped, half overlapping the ends of the tubes, so that a descending quantity of couverture from the slit alights partly directly on to the end of the tubular wafer and partly beyond the end so that it adheres to the (often slightly projecting) ice-cream filling. An alternative form for the enrobing nozzles which under some conditions may be preferred, is an array of 8 mm-diameter round nozzles, instead of slits.

A recycle drain 7 is provided below the application nozzles: this drain has a heater 8 to melt the excess couverture, and a recycle conduct returns this to container 2. Refrigerator means 9 provides cooling for container 3, and container 2 is electrically heated at 10 in a usual way.

When the recycle valve 5 is shut, couverture material passes to the application nozzles: when dosing is not required the valve can be re-opened to give recycling.

It is found that by the use of the arrangement of FIG. 3, fatty coating material can be kept fluid or flowable below its slip melting point, e.g. about 5°–6° C. below a slip melting point of about 25°–27° C. with agitation under pressure, long enough to be applied to confectionery while still flowable at such temperature, and when so applied to a confection can harden much more rapidly than a coating applied above its melting point, and with less unwanted melting of ice confection when this is the material to be coated.

The alternative apparatus shown in FIG. 4 for producing the above-described products is based on a circulating conveyor or line which advances stroke-wise and which has grippers for product units subjected successively to the filling and capping stages of their treatment.

The apparatus comprises a supply conveyor 1 for the tubular wafer containers, which is arranged also to move upward and downward strokewise at a take-up station 2 at which the containers are picked up by grippers such as those shown at 3. The line advances strokewise to a filling station 4 at which the contaiers are held in position while a set of filling nozzles is actuated with a reciprocating movement in the direction 5 to fill the containers batchwise in a similar manner to the operation described above and with reference to FIGS. 2 and 2a. Beyond the filling station 4 the filled containers are rotated successively to each of two opposite vertical positions by rotating stations 6 and 7 and capped by strokewise dipping in molten couverture held in dipping baths 8 which also have a strokewise upward and downward movement to meet the filled containers to be dipped. The filled, capped containers advance into hardening chamber 9 and emerge to be laid down at transport station 10 into packaging unit 11 where they are conveyed and packaged in known manner before final takeoff by conveyor 12 and transfer to a hardening tunnel.

It will be apparent to the skilled reader that the features presented in the above disclosure can be used in any desired variations and combinations.

We claim:

1. An improved composite ice confection product comprising an open-ended hollow wafer container lined with an internal fat-based confection lining, an ice confection filling within the container, a continuous capping of fat-based confection covering the open end of the wafer container and overlapping the adjacent portion of the outside surface of the wafer container, the capping being continuous with the internal fat-based confection lining.

2. A composite ice confection product according to claim 1, wherein the continuous capping of fat-based confection is applied as an application of fat-based material separate from that which lines the wafer container and is congealed with the internal fat-based confection lining for continuity.

3. A composite ice confection product according to claim 1, wherein the continuous capping of fat-based confection, together with the internal fat-based confection lining, forms a substantially continuous impermeable envelope about the ice confection filling.

4. A composite ice confection product according to claim 1, wherein the continuous capping of fat-based confection is applied as a flowable rapid-setting coating maintained in a condition of fluidity below its slip melting-point by shear and overpressure.

5. A composite ice confection product according to claim 1, wherein the capping covers a substantially clean flat or shallow pyramidal surface of the ice confection filling at the open end of the wafer container.

6. A composite ice confection product according to claim 1, wherein the container is tubular, having two open ends, and wherein two continuous cappings of fat-based confection cover each of two opposite open ends of the container.

7. A composite ice confection product according to claim 6, wherein the two cappings of fat-based confection covering each of two opposite circular ends of a tubular wafer container are substantially circular.

8. In an improved process for preparing a composite ice confection product, comprising the steps of:

(a) providing an open-ended hollow wafer container with an internal lining of fat-based confection material, and
   (b) introducing into the lined wafer container a filling of ice confection, the improvement comprising the further steps of:

(c) providing a continuous capping of solidifiable fat-based confection material to cover the open end of the wafer container and to overlap the adjacent portion of the outside surface of the wafer container, and
   (d) solidifying the capping in continuity with the internal fat-based confection lining.

9. A process for preparing a composite ice confection product according to claim 8, wherein the continuous capping of fat-based confection is applied so that it forms together with the internal fat-based confection lining a substantially continuous impermeable envelope about the ice confection filling.

10. A process for preparing a composite ice confection product according to claim 8, wherein the continuous capping of fat-based confection material is applied as a flowable rapid-setting coating maintained in a condition of fluidity below its slip melting-point by shear.

11. The process of claim 10, wherein the fat-based confection material is maintained in a condition of fluidity by shear and overpressure.

12. A process for preparing a composite ice confection product according to claim 8, wherein the continuous capping of fat-based confection material is applied to cover a substantially clean flat or shallow pyramidal surface to the ice confection filling at the open end of the wafer container.

13. A process for preparing a composite ice confection product according to claim 8, wherein the wafer container is tubular and wherein two continuous cappings of fat-based confection are applied covering each of two opposite open ends of the container.

14. A process for preparing a composite ice confection product according to claim 13, wherein two substantially circular cappings of fat-based confection are applied covering each of two opposite substantially circular ends of a tubular wafer container.

15. A process for preparing a composite ice confection product according to claim 8, wherein a succession of the filled hollow wafer confectionery containers are transported to a capping station, a continuous capping of fat-based confection material is applied to cover the open end of the wafer container, and the filled wafer containers are transported away from the capping station.

16. A process according to claim 15, wherein the continuous capping of fat-based confection material is applied by causing it to drop downwardly in fluid form from a slot-shaped dosing nozzle on to and adjacent the open end of the wafer container, and the capping material is allowed to solidify.

17. A process according to claim 16, wherein the capping material is applied below its slip melting point, at about 19°–21° C., in a fluid condition maintained by shear.

18. The process of claim 17, wherein the capping material is maintained in a fluid condition by shear and overpressure.

19. A process according to claim 15, wherein excess capping material is collected and recycled to the supply for the dosing nozzle.

20. A process according to claim 15, wherein the continuous capping material is applied in two successive half end-cappings, and the wafer containers to be coated are inverted by rotation between the successive applications of the capping material.

21. The process of claim 8, wherein the capping applied in step (a) is applied to both cover the open end of the container and to overlap the portion of the outside surface of the container adjacent the open end thereof.

22. An improved process for the production of composite confection products comprising hollow open-ended tubular confectionery wafer containers each having two oppositely and outwardly directed openings, filled with extrudable confection material, said process comprising the steps of transporting the confectionery containers to a filling station comprising a pair of oppositely and inwardly directed extrusion nozzles, holding the confectionary containers to be filled in predetermined alignment with the corresponding extrusion nozzles, moving the extrusion nozzles into the opposite container openings, filling the containers with the confection material by extrusion through the nozzles, removing the extrusion nozzles from the container openings, and transporting the filled confectionery containers away from the filling station.

23. A process for the production of composite confection products according to claim 22, wherein the extrusion nozzles are quickly pushed deep into the corresponding opposite container openings, and the nozzles then slowly withdrawn during the filling operation.

24. A process according to claim 22, wherein a clean substantially flat or shallow pyramidal surface to the filling is formed at the openings of each container at the conclusion of the filling operation.

25. A process according to claim 24, wherein the outward motion of the filling nozzles is briefly arrested after their slow withdrawal from the container during the filling operation, and the outward motion then resumed to give rapid further and complete withdrawal, thereby to leave a clean substantially flat or shallow pyramidal surface to the filling at the openings of the container.

26. A process according to claim 22, wherein a supplementary slight forward initial thrust of extrudable confection from the nozzle is provided at the commencement of filling each container, and a slight backward suck is provided at the conclusion of filling each container.

27. A process according to claim 22, wherein a succession of the filled confectionary containers are transported to a capping station, a continuous capping of flat-based confection material is applied to cover the open ends of the wafer containers, and the filled wafer containers are transported away from the capping station.

28. A process according to claim 27, wherein a continuous capping of fat-based confection material is applied by causing it to drop downwardly in fluid form from a slot-shaped dosing nozzle on to and adjacent the open end of the wafer container, and the capping material is allowed to solidify.

29. A process according to claim 27, wherein the capping material is applied below its slip melting point, at about 19°–21° C., in a fluid condition maintained by shear and by overpressure.

30. A process according to claim 27, wherein excess capping material is recycled to the supply for the dosing nozzle.

31. A process according to claim 27, wherein the continuous capping material is applied in two successive half end-cappings, and the wafer containers to be coated are inverted by rotation between the successive applications of the capping material.

* * * * *